(12) United States Patent
Litz et al.

(10) Patent No.: US 8,298,404 B2
(45) Date of Patent: *Oct. 30, 2012

(54) REACTION SYSTEM AND PRODUCTS THEREFROM

(75) Inventors: Kyle E. Litz, Ballston Spa, NY (US); Jennifer L. Vreeland, Troy, NY (US); Jonathan P. Rankin, Troy, NY (US); Thomas W. DeLancey, Albany, NY (US); Timothy A. Thompson, Clifton Park, NY (US)

(73) Assignee: Auterra, Inc., Malta, NY (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/888,049

(22) Filed: Sep. 22, 2010

(65) Prior Publication Data
US 2012/0067777 A1   Mar. 22, 2012

(51) Int. Cl.
*C10G 17/04*   (2006.01)

(52) U.S. Cl. ............... 208/208 R; 208/254 R; 208/273; 208/238; 208/219; 208/220; 208/222; 208/223; 208/282

(58) Field of Classification Search .................. None
See application file for complete search history.

(56) References Cited

U.S. PATENT DOCUMENTS

| | | |
|---|---|---|
| 2,764,525 A | 9/1956 | Porter et al. |
| 2,910,434 A | 10/1959 | Hess et al. |
| 2,987,470 A | 6/1961 | Turken |
| 3,505,210 A * | 4/1970 | Heimlich et al. ............ 208/228 |
| 3,565,793 A | 2/1971 | Herbstman et al. |
| 3,668,117 A | 6/1972 | Patel et al. |
| 3,819,509 A | 6/1974 | Wolk et al. |
| 3,945,914 A | 3/1976 | Yoo et al. |
| 3,964,995 A | 6/1976 | Wolk et al. |
| 4,192,736 A | 3/1980 | Kluksdahl |
| 4,374,949 A | 2/1983 | Massey et al. |
| 4,444,655 A | 4/1984 | Shiroto et al. |
| 4,645,589 A | 2/1987 | Krambeck et al. |
| 5,637,739 A | 6/1997 | Jacobsen et al. |
| 6,245,223 B1 | 6/2001 | Gorbaty et al. |
| 6,368,495 B1 | 4/2002 | Kocal et al. |
| 6,406,616 B1 * | 6/2002 | Rappas et al. ............. 208/240 |
| 6,544,409 B2 * | 4/2003 | De Souza ................. 208/208 R |
| 6,673,236 B2 | 1/2004 | Stanciulescu et al. |
| 6,846,406 B2 | 1/2005 | Canos et al. |

(Continued)

FOREIGN PATENT DOCUMENTS

WO   2009120238 A1   10/2009

OTHER PUBLICATIONS

Application No. PCT/US08/82095, International Search Report and the Written Opinion of the International Searching Authority, or the Declaration dated Mar. 20, 2009. 12 pages.

(Continued)

*Primary Examiner* — Tam M Nguyen
(74) *Attorney, Agent, or Firm* — Schmeiser, Olsen & Watts, LLP

(57) ABSTRACT

A reaction system and method for removing heteroatoms from oxidized-heteroatom-containing hydrocarbon streams and products derived therefrom are disclosed. An oxidized-heteroatom-containing hydrocarbon feed is reacted in a reaction system thereby forming non-ionic hydrocarbon products. The products derived therefrom are useful as transportation fuels, lubricants, refinery intermediates, or refinery feeds.

14 Claims, 2 Drawing Sheets

U.S. PATENT DOCUMENTS

| | | | |
|---|---|---|---|
| 7,144,499 | B2 | 12/2006 | Han et al. |
| 7,153,414 | B2 * | 12/2006 | De Souza .................. 208/208 R |
| 7,179,368 | B2 | 2/2007 | Rabion et al. |
| 7,314,545 | B2 | 1/2008 | Karas |
| 7,371,318 | B2 | 5/2008 | Canos et al. |
| 7,374,666 | B2 | 5/2008 | Wachs |
| 7,790,021 | B2 * | 9/2010 | Kocal et al. ................... 208/230 |
| 7,875,185 | B2 * | 1/2011 | Zhang ........................... 210/668 |
| 8,197,671 | B2 | 6/2012 | Rankin et al. |
| 2002/0177522 | A1 | 11/2002 | Alexander, IV et al. |
| 2002/0189975 | A1 | 12/2002 | DeSouza |
| 2004/0108252 | A1 * | 6/2004 | De Souza .................. 208/208 R |
| 2004/0178121 | A1 | 9/2004 | Leyshon et al. |
| 2004/0222134 | A1 * | 11/2004 | de Souza ....................... 208/237 |
| 2004/0238410 | A1 | 12/2004 | Inoue et al. |
| 2006/0011510 | A1 | 1/2006 | Toshima et al. |
| 2006/0180501 | A1 | 8/2006 | Da Silva et al. |
| 2008/0308463 | A1 | 12/2008 | Keckler et al. |
| 2009/0065399 | A1 | 3/2009 | Kocal et al. |
| 2011/0011771 | A1 | 1/2011 | Litz et al. |
| 2011/0031164 | A1 | 2/2011 | Litz et al. |
| 2011/0108464 | A1 | 5/2011 | Rankin et al. |

OTHER PUBLICATIONS

Jain, Suman L., et al. Rehenium-Catalyzed Highly Efficient Oxidations of Tertiary Nitrogen Compounds to N-Oxides Using Sodium Percarbonate as Oxygen Source. Synlett, 2006, No. 16, pp. 2661-2663. Published on Web Sep. 22, 2006.

McKillop, Alexander, et al. Further Functional-Group Oxidations Using Sodium Perborate. Tetrahedron, vol. 45, No. 11, pp. 3299 to 3306, 1989. Published in Great Britain.

Varma, Rajender S., et al. The Urea-Hydrogen Peroxide Complex: Solid-State Oxidative Protocols for Hydroxylated Aldehydes and Ketones (Dakin Reaction), Nitriles, Sulfides, and Nitrogen Heterocycles. Organic Letters, 1999, vol. 1, No. 2, pp. 189-191. Published on Web May 29, 1999.

Jana, Nirmal K., et al. Phase-Vanishing Methodology for Efficient Bromination, Alkylation, Epoxidation, and Oxidation Reactions of Organic Substrates. Organic Letters, 2003, vol. 5, No. 21, pp. 3787-3790. Published on Web Sep. 16, 2003.

Khodaei, Mohammad Mehdi, et al. H2O2/Tf2O System: An Efficient Oxidizing Reagent for Selective Oxidation of Sulfanes. Synthesis, 2008; No. 11, pp. 1682-1684. Published on Web Apr. 11, 2008.

Kim, Sung Soo, et al. A Mild and Highly Efficient Oxidation of Sulfide to Sulfoxides with Periodic Acid Catalyzed by FeCl3. Synthesis, 2002, No. 17, pp. 2484-2486. Published USA Feb. 12, 2002.

Qian, Weixing, et al. Efficient and Highly Selective Oxidation of Sulfides to Sulfoxides in the Presence of an Ionic Liquid Containing Hypervalent Iodine. Synlett, 2006, No. 5, pp. 709-712. Published on Web Mar. 9, 2006.

Matteucci, Mizio, et al. Mild and Highly Chemoselective Oxidation of Thioethers Mediated by Sc(OTf)3. Organic Letters, 2003, vol. 5, No. 3, 235-237. Published on Web Jan. 11, 2003.

MBA, Myriam, et al. C3-Symmetric Ti(IV) Triphenolate Amino Complexes as Sulfoxidation Catalysts with Aqueous Hydrogen Peroxide. Organic Letters, 2007, vol. 9, No. 1, pp. 21-24. Published on Web Dec. 9, 2006.

Drago, Carmelo, et al. Vanadium-Catalyzed Sulfur Oxidation/Kinetic Resolution in the Synthesis of Enantiomerically Pure Alkyl Aryl Sulfoxides. Agnew. Chem. Int. Ed, 2005, 44, pp. 7221-7223. Published on Web Oct. 17, 2005.

Egami, Hiromichi, et al. Fe(salan)-Catalyzed Asymmetric Oxidation of Sulfides with Hydrogen Peroxide in Water. J. Am. Chem. Soc., 2007, vol. 129, No. 29, pp. 8940-8941. Published on Web Jun. 29, 2007.

Sun, Jiangtao, et al. Efficient Asymmetric Oxidation of Sulfides and Kinetic Resolution of Sulfoxides Catalyzed by a Vanadium-Salan System. J. Org. Chem., 2004, vol. 69, No. 24, pp. 8500-8503. Published on Web Oct. 28, 2004.

Karimi, Babak, et al. Selective Oxidation of Sulfides to Sulfoxides Using 30% Hydrogen Peroxide Catalyzed with a Recoverable Silica-Based Tungstate Interphase Catalyst. Organic Letters, 2005, vol. 7, No. 4, pp. 625-628. Published on Web Jan. 25, 2005.

Ali, Mohammed Hashmat, et al. Ceric Ammonium Nitrate Catalyzed Oxidation of Sulfides to Sulfoxides. Synthesis, 2007, No. 22, pp. 3507-3511. Published on Web Oct. 16, 2007.

Imada, Yasushi, et al. Flavin Catalyzed Oxidations of Sulfides and Amines with Molecular Oxygen. J. Am Chem. Soc., 2003, vol. 125, No. 10, pp. 2868-2869. Published on Web Feb. 12, 2003.

Varma, Rajender S., et al. The Urea-Hydrogen Peroxide Complex: Solid-State Oxidatives Protocols for Hydroxylated Aldehydes and Ketones (Dakin Reaction), Nitriles, Sulfides, and Nitrogen Heterocycles. Organic Letters, 1999, vol. 1, No. 2, pp. 189-191. Published on Web May 29, 1999.

Jana, Nirmal K.,e t al. Phase-Vanishing Methodology for Efficient Bromination, Alkylation, Epoxidation, and Oxidation Reactions of Organic Substrates. Organic Letters, 2003, vol. 5, No. 21, pp. 3787-3790. Published on Web Sep. 16, 2003.

Shaabani, Ahmad, et al. Green oxidations. The use of potassium permanganate supported on manganese dioxide. Tetrahedron, 2004, 60, pp. 11415-11420. Published on Web Oct. 12, 2004.

Wozniak, Lucyna A., et al. Oxidation in Organophosphorus Chemistry: Potassium Peroxymonosulphate. Tetrahedron, 1999, 40, pp. 2637-2640. Received Oct. 13, 1998; Accepted Feb. 3, 1999. No published date.

Akasaka, Takeshi,e t al. Singlet Oxygen Oxidation of Organophosphorus Compounds: Cooxidation of Olefin with Phosphadioxirane. Quimica Nova, 1993, 16, pp. 325-327. No published date or location.

Milner, O.I., et al. Determination of Trace Materials in Crudes and Other Petroleum Oils. Analytical Chemistry, vol. 24, No. 11. Published Nov. 1952, USA.

Aida, Tetsuo, et al. Development of an Efficient Coal-Desulfurization process: "Oxy-Alkalinolysis". Technical Report Resource Conference: American Chemical Society symposium on coal liquefaction, pp. 328-334. Kansas City, MO USA. Published Sep. 1, 1982 Ames Lab., IA (USA); Advanced Fuel Research, Inc., East Hartford, CT (USA).

Aida, Tetsuo, et al. Reaction of Dibenzothiophene Sulfone with Alkoxides. Tetrahedron Letters (1983), vol. 24, No. 34, pp. 3543-3546. USA.

Oviedo, Alberto, et al. Deoxydesulfurization of sulfones derived from dibenzothiophene using nickel compounds. Journal of Molecular Catalysis A: Chemical, (2008) 293, pp. 65-71. USA.

U.S. Appl. No. 12/904,446, filed Oct. 14, 2010.

International Search Report and Written Opinion mailed Jan. 12, 2012; PCT/US11/50159; Int'l File Date: Sep. 1, 2011; 13 pages.

Office Action (Mail Date Apr. 11, 2012) for U.S. Appl. No. 12/933,898, filed Sep. 22, 2010.

Notice of Allowance (Mail Date Feb. 13, 2012) for U.S. Appl. No. 12/904,446, filed Oct. 14, 2010.

U.S. Appl. No. 13/493,240, filed Jun. 11, 2012.

Office Action (Mail Date Jul. 31, 2008) for U.S. Appl. No. 10/863,194, filed Jun. 8, 2004.

* cited by examiner

REACTION SYSTEM AND PRODUCTS THEREFROM

BACKGROUND

The present disclosure is directed to systems and methods for treating crude oil, intermediate refining streams, and refining products to substantially reduce the content of undesired heteroatoms, specifically sulfur, nitrogen, nickel, vanadium, iron and reduce the total acid number and to do so utilizing equipment that has a relatively low capital investment and is economical to operate.

Systems and methods for removing oxidized-heteroatom contaminants including, but not limited to, sulfur, nitrogen, nickel, vanadium, iron and reduce the total acid number of liquid hydrocarbon feed streams are disclosed. After subjecting a liquid hydrocarbon stream to oxidation conditions, thereby oxidizing at least a portion of the heteroatom compounds (e.g., oxidizing dibenzothiophenes to sulfones), the oxidized heteroatom compounds are reacted with caustic (e.g., sodium hydroxide, potassium hydroxide, eutectic mixtures thereof etc.) and a selectivity promoter to produce substantially lower heteroatom-containing hydrocarbon products.

As is well known in the industry, crude oil contains heteroatoms such as sulfur, nitrogen, nickel, vanadium and acidic oxygenates in quantities that negatively impact the refinery processing of the crude oil fractions. Light crude oils or condensates contain heteroatoms in concentrations as low as 0.001 Wt %. In contrast, heavy crude oils contain heteroatoms as high as 5-7 Wt %. The heteroatom content of crude oil increases with increasing boiling point and the heteroatom content increases with decreasing API gravity. These impurities must be removed during refining operations to meet the environmental regulations for the final product specifications (e.g., gasoline, diesel, fuel oil) or to prevent the contaminants from decreasing catalyst activity, selectivity, and lifetime in downstream refining operations. Contaminants such as sulfur, nitrogen, trace metals, and total acid number (TAN) in the crude oil fractions negatively impact these downstream processes, and others, including hydrotreating, hydrocracking and FCC to name just a few. These contaminants are present in the crude oil fractions in varying structures and concentrations.

It is widely recognized that the emission of sulfur oxides from fossil fuel combustion causes a serious atmospheric pollution problem. Indeed, the sulfur is converted through combustion into various sulfur oxides that can be transformed into acids, thus, it is believed, $SO_x$ emissions contribute to the formation of acid rain and also to the reduction of the efficiency of catalytic converters in automobiles. Furthermore, sulfur compounds are thought to ultimately increase the particulate content of combustion products.

A variety of methods have been proposed for removing sulfur compounds either from fuels before combustion or from emission gases afterward. Most refineries employ hydrodesulfurization (HDS) as the predominant process for removing sulfur from hydrocarbon streams. HDS remains a cost-effective option for light streams with sulfur levels up to about 2% (w/w) elemental sulfur. But the environmental benefits of HDS are offset in very heavy and sour (>2% elemental sulfur) streams because the energy input to the reaction, the high pressures and the amount of hydrogen necessary to remove the sulfur paradoxically create a substantial $CO_2$ emission problem.

Because of these issues, reduction of contaminants and, in particular, of the sulfur content in hydrocarbon streams has become a major objective of environmental legislation worldwide. Pending sulfur regulations in the United States for on-road diesel will be 15 ppm in NRLM diesel fuel. By October 2012, on road diesel sulfur specifications will be 15 ppm for NRLM diesel fuel. In the European Union that specification is expected to tighten to 10 ppm in January 2011 for diesels intended for inland waterways and for on-road and off-road diesel operated equipment. In China, the on-road diesel specification will be 10 ppm by 2012. Currently the tightest specifications in the world are in Japan, where the on-road diesel specification is 10 ppm.

Refiners typically use catalytic hydrodesulfurizing ("HDS", commonly referred to as "hydrotreating") methods to lower the sulfur content of hydrocarbon fuels. In HDS, a hydrocarbon stream that is derived from a petroleum distillation is treated in a reactor that operates at temperatures ranging between 575 and 750.degree. F. (.about.300 to .about.400.degree. C.), a hydrogen pressure that ranges between 430 to 14,500 psi (3000 to 10,000 kPa or 30 to 100 atmospheres) and hourly space velocities ranging between 0.5 and 4 h.sup.−1. Dibenzothiophenes in the feed react with the hydrogen when in contact with a catalyst arranged in a fixed bed that comprises metal sulfides from groups VI and VIII (e.g., cobalt and molybdenum sulfides or nickel and molybdenum sulfides) supported on alumina. Because of the operating conditions and the use of hydrogen, these methods can be costly both in capital investment and operating costs.

As is currently known, HDS or hydrotreating may provide a treated product in compliance with the current strict sulfur level targets. However, due to the presence of sterically hindered refractory sulfur compounds such as unsubstituted and substituted dibenzothiophenes, the process is not without issues. For example, it is particularly difficult to eliminate traces of sulfur using such catalytic processes when the sulfur is contained in molecules such as dibenzothiophene with alkyl substituents in position 4, or 4 and 6. Attempts to completely convert these species, which are more prevalent in heavier stocks such as diesel fuel and fuel oil, have resulted in increased equipment costs, more frequent catalyst replacements, degradation of product quality due to side reactions, and continued inability to comply with the strictest sulfur requirements for some feeds.

This has prompted many to pursue non-hydrogen alternatives to desulfurization, such as oxydesulfurization. One attempt at solving the thiophene problem discussed above includes selectively desulfurizing dibenzothiophenes contained in the hydrocarbon stream by oxidizing the dibenzothiophenes into a sulfone in the presence of an oxidizing agent, followed by optionally separating the sulfone compounds from the rest of the hydrocarbon stream. Oxidation has been found to be beneficial because oxidized sulfur compounds can be removed using a variety of separation processes that rely on the altered chemical properties such as the solubility, volatility, and reactivity of the sulfone compounds. One specific sulfoxidation method and system is disclosed in International Publication Number WO 2009/120238 A1, to Litz et al., the disclosure of which is hereby incorporated by reference to the extent not inconsistent with the present disclosure.

One issue with sulfoxidation lies in the disposal of the sulfones. If the sulfones are hydrotreated, they may be converted back to the original dibenzothiophene compounds thereby regenerating the original problem. The feed sulfur content may be likely to be in the range of 0% to 10% weight sulfur. Sulfur, on average, comprises about 15 wt % of substituted and unsubstituted dibenzothiophene molecules. Therefore, up to 67 wt % of the oil may be removed as sulfone extract. For a typical refinery processing 40,000 barrels per day of crude oil, up to 27,000 barrels per day of sulfone oil will be generated, which is believed to be too much to dispose conventionally as a waste product. Further, the disposal of sulfone oil also wastes valuable hydrocarbons, which could theoretically be recycled if an efficient process were available.

As stated above, the primary challenge presented to oxydesulfurization remains the removal of the $SO_x$ from the sulfone and sulfoxide groups created by oxidation of the initial organic sulfur species. Kocal et al., U.S. Pat. No. 7,790,021 B2, the disclosure of which is hereby incorporated by reference to the extent not inconsistent with the present disclosure, teach the use of an aqueous caustic stream and a caustic waste stream to treat the sulfones and sulfoxide streams to produce substituted biphenyls. The problem with the disclosed method is the costly extra steps to remove the substituted biphenyl products from the aqueous caustic stream and the lack of selectivity towards unsubstituted biphenyls, and the lack of teaching any effect on other heteroatom-containing species.

A similar teaching of the use of molten caustic was disclosed by Aida et al (reference) to treat the sulfones in oxidized coal. Aida's teaching gives rise to ionizable and non-ionizable biphenyls with no apparent selectivity to product formation. Aida later teaches (Tetrahedron Letters publication) that desulfonylation with caustic alkoxide ions proceeds with predominant formation of carbon oxygen bond formation but still substantive formation of hydroxybiphenyls which are extremely challenging to separate from the caustic stream because they are ionizable.

Garcia et al (J. Mol. Catalysis 2008) teach a desulfonylation reaction catalyzed by nickel compounds. Aida and Kocal et al. showed that caustics react with sulfones, but their methods do not show selectivity to unsubstituted products and has not been shown capable of removing other heteroatoms. Garcia et al. show that there is a way to selectively make unsubstituted biphenyls from sulfones, but fail do so in a cost effective manner and they do not demonstrate the capability of removing other heteroatoms. The method unfortunately employs an expensive stoichiometric Grignard reagent to selectively form unsubstituted biphenyl products and is therefore unsuited to commercial fuel treatment for economic reasons.

Documents and references believed relevant to the present disclosure follow:

Reaction of Dibenzothiophene Sulfone with Alkoxides Aida, T.; Squires, T. G.; Venier, C. G. Tetrahedron Letters, (1983), 24(34) p 3543-3546

Development of an efficient coal-desulfurization process: oxy-alkinolysis Authors Aida, T.; Venier, C. G.; Squires, T. G.
Publication Date 1982 Sep. 1 Technical Report Resource Conference: American Chemical Society symposium on coal liquefaction, pages 328-334 Kansas City, Mo., USA, 1 Sep. 1982 Ames Lab., IA (USA); Advanced Fuel Research, Inc., East Hartford, Conn. (USA) Deoxydesulfurization of Sulfones Derived from Dibenzothiophene using Nickel Compounds, Authors: Alberto Oviedo, Jorge Tones-Nieto, Alma Arevalo, and Juventino J. Garcia. J. Mol. Catalysis. A: Chemical, (2008) 293, p 65-71.

It has long been known that various metallic elements are found in naturally occurring and synthetic crude oils (see O. I. Miller et al, Anal. Chem., 24, 1728 [1952]).

Some of these metal impurities are known to be harmful when present in charge stocks for petroleum refining, for example cracking, when present in fuels for boilers and turbines and the like uses.

A process for removing vanadium and sodium from a crude oil is disclosed in U.S. Pat. No. 2,764,525 (F. W. Porter et al) wherein the oil is contacted in the presence of hydrogen with alumina containing a minor amount of ferric oxide.

A method of treating petroleum oil containing trace metal components is disclosed in U.S. Pat. No. 2,910,434 (H. V. Hess, et al) wherein the oil is contacted with an inert packing material in the presence of hydrogen gas.

In U.S. Pat. No. 2,987,470 (M. Turken) a process is disclosed for demineralizing oil by contact thereof in an ebullated bed with particulate contact materials, for example bauxite, alumina and the like.

In U.S. Pat. No. 3,819,509 (R. H. Walk et al) metal- and sulfur-containing contaminants in a residual oil are removed from the oil by contacting the oil in the presence of desulfurization catalyst and an intimate admixture of inert demetallization solids.

In U.S. Pat. No. 3,964,995 (R. H. Walk et al) metals are removed from sulfur- and metals-contaminated oil using porous alumina solids activated with an oxide promoter of the group $Fe_2O_3$, $TiO_2$ and $SiO_2$.

In U.S. Pat. No. 4,192,736 (Kluksdahl) metals are removed from oil by contact with alumina containing a phosphorous oxide promoter.

In U.S. Pat. No. 4,645,589 (F. J. Krambeck et al) metals are removed from oil by aqueous phase extraction with a phosphorous compound.

A process for removing metals and coke precursors is disclosed in U.S. Pat. No. 6,245,223 (M. L. Gorbaty et al) wherein the oil is contacted with a solid, low surface area adsorbent.

Therefore, there is a need for a selective process for removing heteroatoms (including, but not limited to, sulfur, nitrogen, nickel, vanadium, iron and the like) from an oxidized-heteroatom-containing hydrocarbon stream thereby avoiding the need of expensive reagents, waste disposal, and other separation and handling as well as cost issues associated with the waste streams.

The inventors of the present disclosure have unexpectedly discovered that the removal of heteroatoms from substantially oxidized-heteroatom-containing hydrocarbon streams may be promoted by employing the novel reaction system detailed herein. What we herein disclose are systems and methods for showing selectivity toward non-ionic hydrocarbon products employing a novel caustic reaction system. Not only have we learned that our reaction system functions for sulfur removal but we also have learned that it has a beneficial capability of removing nitrogen, trace metals and reducing the total acid number of a hydrocarbon fuel and increasing the API gravity.

SUMMARY OF THE DISCLOSURE

A reaction method and system for decreasing the heteroatom content, decreasing the total acid number, and increasing the API gravity from a substantially oxidized-heteroatom-containing hydrocarbon feed stream, including, but not limited to, internal refinery streams, crude oil or distilled fraction of crude oil is disclosed. The reaction system may be presently preferably heated and may comprise a feed inlet region, a reaction region and an outlet region; the reaction region may comprise a caustic compound, optionally a mixture of caustic compounds, and optionally supported on an inert metal oxide, and a molten caustic liquid, and optionally a molten caustic mixture; the inlet region receives the feed independently or as a mixture comprising a oxidized-heteroatom-rich hydrocarbon and a selectivity promoter that combine to contact with the caustic compound(s); wherein the oxidized-heteroatom-rich hydrocarbons react with the caustic and selectivity promoter producing substantially non-ionic hydrocarbon products that exit via the outlet region with a lower heteroatom content than the feed.

The caustic component of the reaction region of the system of the present disclosure may be any inorganic compounds that exhibit basic properties; presently preferably inorganic oxides from group IA and IIA elements; more presently preferably inorganic hydroxides from group IA and IIA elements, or optionally mixtures of oxides and hydroxides of group IA and IIA elements; even more presently preferably molten hydroxides of group IA and IIA elements, or optionally mixtures of hydroxides of said elements; and presently most preferably molten NaOH, KOH, or a mixture thereof. Non-limiting examples may include, but are not limited to, $Li_2O$, $Na_2O$, $K_2O$, $Rb_2O$, $Cs_2O$, $Fr_2O$, BeO MgO, CaO, SrO, BaO, and the like as well as LiOH, NaOH, KOH, RbOH, CsOH, FrOH, $Be(OH)_2$, $Mg(OH)_2$, $Ca(OH)_2$, $Sr(OH)_2$, $Ba(OH)_2$, and the like, and their mixtures or molten mixtures thereof.

The optional support components of the reaction region of the reaction system of the present disclosure may be any inorganic oxide, either inert or active; in particular a porous support such as talc or inorganic oxides may be utilized as support components.

Suitable inorganic oxides may be oxides of elements of groups 2, 3, 4, 5, 13, 14, and 16 of the Periodic Table of the Elements. Examples of oxides preferred as supports may include silicon dioxide, aluminum oxide and also mixed oxides of the two elements and corresponding oxide mixtures. Other inorganic oxides which may be used alone or in combination with the abovementioned preferred oxide supports may be, for example, MgO, $ZrO_2$, $TiO_2$ or CaO, to name only a few.

The support materials used may have a specific surface area in the range from 10 to 1000 $m^2/g$, a pore volume in the range from 0.1 to 5 ml/g and a mean particle size of from 0.1 to 10 cm. Preference may be given to supports having a specific surface area in the range from 0.5 to 500 $m^2/g$, a pore volume in the range from 0.5 to 3.5 ml/g and a mean particle size in the range from 0.5 to 3 cm. Particular preference may be given to supports having a specific surface area in the range from 200 to 400 $m^2/g$, and a pore volume in the range from 0.8 to 3.0 ml/g The selectivity promoter may be an organic alcohol, ROH, wherein R is a C1-C18 alkyl-, aryl-, or alkenyl-group, that produces non-ionic hydrocarbon product from the oxidized-heteroatom feed. The hydrocarbon product may be substantially insoluble in the molten caustic and exits the outlet region and may be preferred to a reaction system not containing a selectivity promoter because the reaction products with caustics may tend to be organic hydroxides which are substantially in the ionic form in severely caustic environments and thus may be more challenging to separate from the caustic without considerable expense. The selectivity promoter may be more preferably an alcohol, a diol, or a polyol and mixtures thereof. Non limiting examples include, but are not limited to: methanol, benzyl alcohol, ethylene glycol, propylene glycol, glycerol, pinacol, 1,3-propanediol and the like that may produce non-ionic product from the oxidized-heteroatom feed. The non-ionic product may be substantially insoluble and/or inert to caustic and exits the outlet region and may be more preferred to a reaction system containing ionic products.

In order to provide a reaction system for decreasing the heteroatom content (sulfur, nitrogen, vanadium, and nickel), decreasing the Total Acid Number, and increasing API gravity of heteroatom-containing hydrocarbon feed streams, the reaction system is preferably heated and comprises a feed inlet region, a reaction region and an outlet region; the reaction region comprises a caustic compound, optionally a mixture of caustic compounds, and optionally supported on an inert metal oxide, and optionally a molten caustic liquid, and optionally a molten caustic mixture; the inlet region receives the hydrocarbon feed independently or as a mixture comprising a oxidized-heteroatom-rich hydrocarbon and a selectivity promoter that combine to contact with the caustic compound(s); wherein the oxidized-heteroatom-rich hydrocarbons react with the caustic and selectivity promoter producing substantially non-ionic hydrocarbon products that exit via the outlet region with a lower heteroatom content than the feed.

The caustic component operatively positioned in the reaction region of the system of the present disclosure may be any inorganic compounds that exhibit basic properties which includes, but is not limited to, inorganic oxides from group IA and IIA elements, inorganic hydroxides from group IA and IIA elements, or optionally mixtures of oxides and hydroxides of group IA and IIA elements, molten hydroxides of group IA and IIA elements, or optionally mixtures of hydroxides of said elements. Presently preferably inorganic oxides or hydroxides from group IA and IIA elements. More presently preferably inorganic hydroxides from group IA and IIA elements, or optionally mixtures of oxides and hydroxides of group IA and IIA elements. Even more presently preferably molten hydroxides of group IA and IIA elements, or optionally mixtures of hydroxides of said elements. Presently most preferably molten NaOH, KOH, or a mixture thereof. Non-limiting examples may include $Li_2O$, $Na_2O$, $K_2O$, $Rb_2O$, $Cs_2O$, $Fr_2O$, BeO MgO, CaO, SrO, BaO, and the like as well as LiOH, NaOH, KOH, RbOH, CsOH, FrOH, $Be(OH)_2$, $Mg(OH)_2$, $Ca(OH)_2$, $Sr(OH)_2$, $Ba(OH)_2$, and the like, and their mixtures or molten mixtures thereof.

Optional support components of the reaction region of the reaction system of the present disclosure may be any inorganic oxide, inert or active, such as, for example, a porous support such as talc or inorganic oxides.

Suitable inorganic oxides are oxides of elements of groups 2, 3, 4, 5, 13, 14, 15 and 16 of the Periodic Table of the Elements. Examples of oxides preferred as supports include silicon dioxide, aluminum oxide and also mixed oxides of the two elements and corresponding oxide mixtures. Other inorganic oxides which can be used alone or in combination with the abovementioned preferred oxide supports are, for example, MgO, $ZrO_2$, $TiO_2$ or CaO, to name only a few.

The support materials used have a specific surface area in the range from 10 to 1000 $m^2/g$, a pore volume in the range from 0.1 to 5 ml/g and a mean particle size of from 0.1 to 10 cm. Preference is given to supports having a specific surface area in the range from 0.5 to 500 $m^2/g$, a pore volume in the range from 0.5 to 3.5 ml/g and a mean particle size in the range from 0.5 to 3 cm. Particular preference is given to supports having a specific surface area in the range from 200 to 400 $m^2/g$, and a pore volume in the range from 0.8 to 3.0 ml/g.

Other advantages and features will be apparent from the following detailed description when read in conjunction with the attached drawings including the application of the disclosed techniques to streams other than diesel, such as, for example, crude oil, bitumen, gas oils, kerosene, transportation fuels, lubricants, and refinery intermediates and other contaminated hydrocarbon streams containing sulfur and other contaminants.

BRIEF DESCRIPTION OF THE DRAWINGS

For a more complete understanding of the disclosed systems and methods, reference should be made to the flow diagrams of FIG. 1 and the equations of FIG. 2.

DETAILED DESCRIPTION OF THE DISCLOSURE

Figure 1:
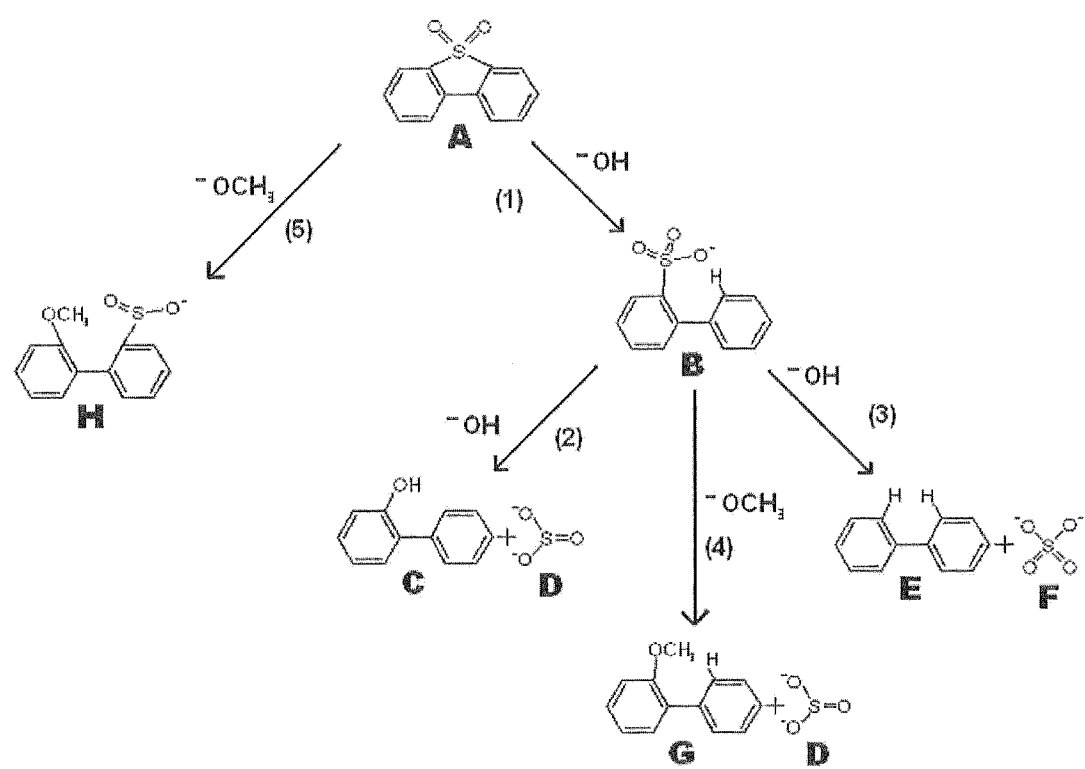

Unless otherwise indicated, all numbers expressing quantities of ingredients, properties such as molecular weight, reaction conditions, and so forth used in this specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

Unless otherwise noted, the term "effective amount," as used herein, includes that amount of a substance capable of either increasing (directly or indirectly) the yield of the desulfonylation product or increasing selectivity towards sulfur-free product formation. Unless otherwise noted, optimum amounts of a given catalyst, heat or steam can vary based on reaction conditions and the identity of other constituents yet can be readily determined in light of the discrete circumstances of a given application. Unless otherwise noted, the term "conversion" or more precisely "percent conversion" ("% cony."), as used herein, describes the proportion of moles of sulfone converted by the combination of desulfonylation and deoxygenation reactions relative to sulfone fed into the reaction. Unless otherwise noted, the term "selectivity" as used herein describes the mole percent products converted that contain no sulfur. Unless otherwise noted, the term "yield" as used here and describes the mole percent products converted to a non-ionic hydrocarbon.

Reaction systems and methods for removing heteroatoms from oxidized-heteroatom-containing hydrocarbon streams and low-heteroatom containing hydrocarbon products derived therefrom are disclosed. An oxidized-heteroatom-rich hydrocarbon feed, such as, for example, one provided by the sulfoxidation method and system disclosed in International Publication Number WO 2009/120238 A1, to Litz et al., may be reacted in the reaction system thereby forming substantially heteroatom free hydrocarbon products that are readily separated from each other by conventional separation methods (i.e. vapor-liquid, liquid-liquid, or adsorption methods). The hydrocarbon products derived from the reaction system and method may be useful as transportation fuels, lubricants, and refinery feeds, refinery intermediates and products.

In order to provide a reaction system and method for reducing the heteroatom content and increasing API gravity, decreasing TAN of oxidized-heteroatom-containing hydrocarbon feed streams, the reaction system may be preferably heated and comprises a feed inlet region, a reaction region and an outlet region; the reaction region comprises a caustic compound, optionally a mixture of caustic compounds, and optionally supported on an inert metal oxide, and optionally a molten liquid, and optionally a molten mixture; the inlet region may receive the hydrocarbon feed independently or as a mixture comprising a sulfone-rich hydrocarbon and a selectivity promoter that combine to contact with the caustic compound(s); wherein the oxidized-heteroatom-rich hydrocarbons react with the caustic and selectivity promoter producing substantially non-ionic hydrocarbon products that exit via the outlet region with a lower heteroatom content than the feed.

The caustic component operatively positioned in the reaction region of the system of the present disclosure may be any inorganic compounds that may exhibit basic properties which includes, but is not limited to, inorganic oxides from group IA and IIA elements, inorganic hydroxides from group IA and IIA elements, or optionally mixtures of oxides and hydroxides of group IA and IIA elements, molten hydroxides of group IA and IIA elements, or optionally mixtures of hydroxides of said elements. Non-limiting examples may include $Li_2O$, $Na_2O$, $K_2O$, $Rb_2O$, $Cs_2O$, $Fr_2O$, BeO MgO, CaO, SrO, BaO, and the like as well as LiOH, NaOH, KOH, RbOH, CsOH, FrOH, $Be(OH)_2$, $Mg(OH)_2$, $Ca(OH)_2$, $Sr(OH)_2$, $Ba(OH)_2$, and the like, and their mixtures or molten mixtures thereof.

Optional support components of the reaction region of the reaction system of the present disclosure may be any inorganic oxide, inert or active, such as, for example, a porous support such as talc or inorganic oxides.

Suitable inorganic oxides may be oxides of elements of groups 2, 3, 4, 5, 13, 14, and 16 of the Periodic Table of the Elements. Examples of oxides preferred as supports include silicon dioxide, aluminum oxide and also mixed oxides of the two elements and corresponding oxide mixtures. Other inorganic oxides which may be used alone or in combination with the abovementioned preferred oxide supports may be, for example, MgO, $ZrO_2$, $TiO_2$ or CaO, to name only a few.

The support materials used may have a specific surface area in the range from 10 to 1000 $m^2/g$, a pore volume in the range from 0.1 to 5 ml/g and a mean particle size of from 0.1 to 10 cm. Preference may be given to supports having a specific surface area in the range from 0.5 to 500 $m^2/g$, a pore volume in the range from 0.5 to 3.5 ml/g and a mean particle size in the range from 0.5 to 3 cm. Particular preference may be given to supports having a specific surface area in the range from 200 to 400 $m^2/g$, and a pore volume in the range from 0.8 to 3.0 ml/g.

The selectivity promoter may be an organic alcohol, ROH, wherein R is a C1-C18 alkyl-, aryl-, or alkenyl-group, that produces non-ionic hydrocarbon product from the oxidized-heteroatom feed. The hydrocarbon product may be substantially insoluble in the molten caustic and exits the outlet region and may be preferred to a reaction system not containing a selectivity promoter because the reaction products without the promoter tend to be organic hydroxides which are substantially in the ionic form in severely caustic environments and thus may be more challenging to separate from the caustic without considerable expense. The selectivity promoter may be presently more preferably an alcohol, a diol, or a polyol and mixtures thereof. Non limiting examples include, but are not limited to: methanol, benzyl alcohol, ethylene glycol, propylene glycol, glycerol, pinacol, 1,3-propanediol and the like that may produce non-ionic product from the oxidized-heteroatom feed. Presently more preferred selectivity promoters fall into the class of compounds referred to as vicinal diols, which may have hydroxyl groups bound to adjacent carbon atoms, or the class of alcohols known as primary alcohols, where the hydroxyl group is bound to a carbon atom, that carbon atom being bound to at most one other carbon atom. Presently most preferred may be ethylene glycol or methanol. The non-ionic hydrocarbon product may be substantially insoluble and/or inert to the caustic and exits the outlet region and may be more preferred to a reaction system containing ionic products.

FIG. 1 illustrates how the selectivity of the reaction of the present disclosure is improved to form more valuable products. Dibenzothiophene sulfone was chosen as a model sulfur compound because most of the sulfur in an average diesel fuel is in the form of substituted or unsubstituted dibenzothiophene. Equation (1) illustrates how hydroxide attacks the sulfur atom of dibenzothiophene sulfone (A), forming biphenyl-2-sulfonate (B). Equation (2) illustrates how hydroxide may attack B at the carbon atom adjacent to the sulfur atom, forming biphenyl-2-ol (C) and sulfite salts (D). Compound C may ionize in basic media, and may dissolve in the aqueous or molten salt layer. Equation (3) illustrates how hydroxide may attack the sulfur atom of B to form biphenyl (E) and sulfate salts (F). Equation (4) illustrates how, in the presence of a primary alcohol, including, but not limited to, methanol, methoxide ions generated in-situ may attack the carbon atom, forming ether compounds, such as 2-methoxybiphenyl (G). Equation (5) illustrates the reaction of dibenzothiophene sulfone with alkoxides alone, not in the presence of hydroxide, as taught by Aida et al, to form biphenyl-2-methoxy-2'-sulfinate salt (H), which may be substantially soluble in the caustic. Using aqueous or molten hydroxide without the presently disclosed selectivity promoter will cause reaction (1) to occur, followed predominantly by reaction (2). When the vicinal diol selectivity promoter disclosed herein is used, reaction (1) occurs, followed predominantly by reaction (3). When the primary selectivity promoter (alcohol) disclosed herein is used, reaction (1) occurs, followed predominantly by reaction (4). It can be seen that the hydrogen atoms that become attached to biphenyl come from hydroxide. When water is used in the regeneration of the caustic, the ultimate source of the hydrogen atoms added to the biphenyl may be water.

Figure 2:
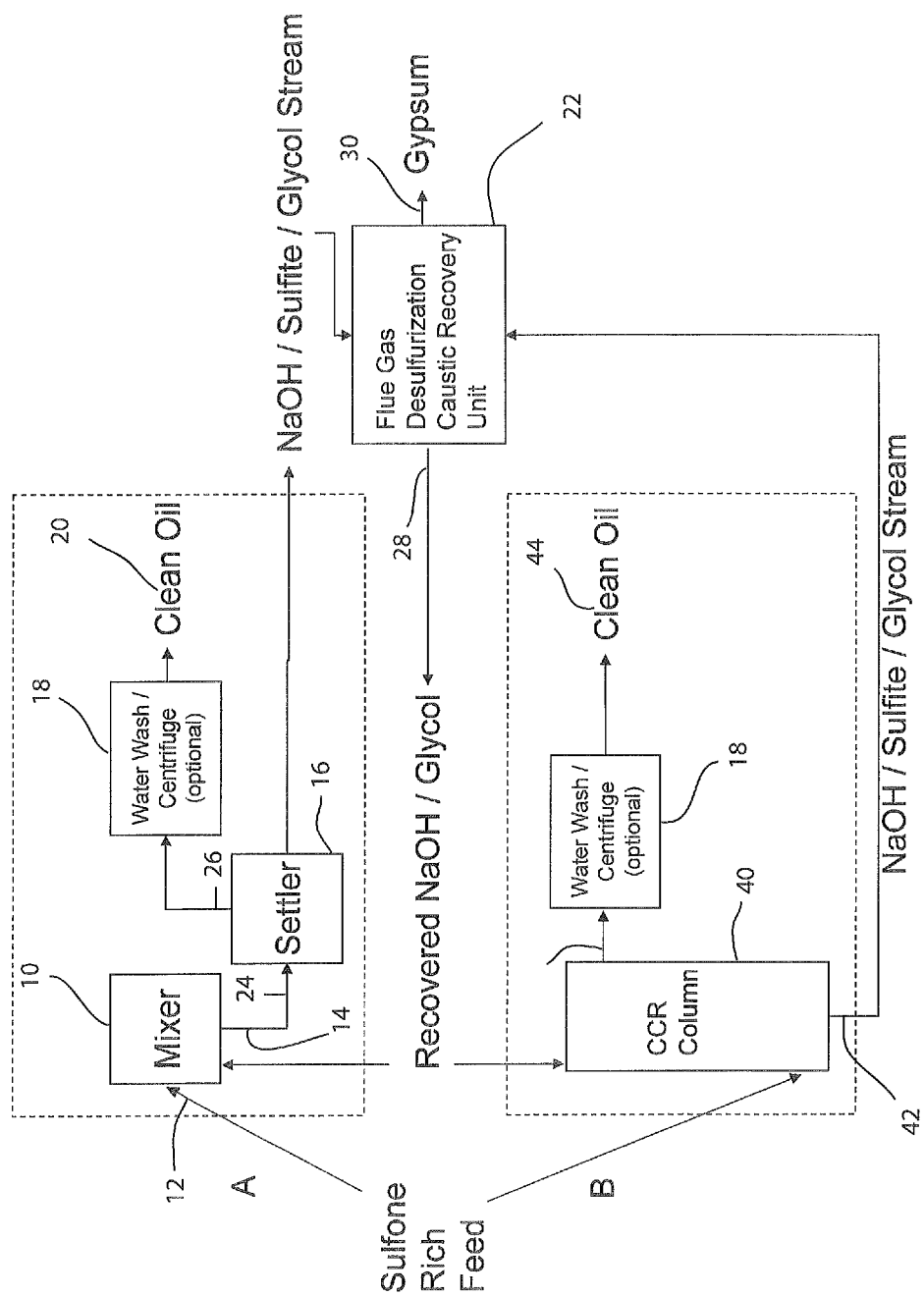

Two representative embodiments of a plurality of possible representative embodiments of the systems and methods for removing contaminants from hydrocarbon streams and feed contaminated products derived therefrom are shown in FIG. 2. Both systems and methods may begin with a heteroatom-contaminated hydrocarbon feed to be subjected to treatment in order to meet current and future environmental standards. In one representative system and method, an oxidized-heteroatom-containing hydrocarbon feed may be provided through the line A to a mixing vessel 10 through a feed inlet where the contaminated feed may be combined with a caustic and a selectivity promoter where it is allowed to react in the mixing vessel 10 to decontaminate the contaminated feed. The reacting combination may be preferably heated generally in a range of temperature from 50-450 C at a pressure from 0-800 psi.

The mixing vessel 10 may comprise a feed inlet 12, a reaction mixture comprising an oxidized-heteroatom-containing hydrocarbon streams, caustic, glycol, and reaction intermediates and products, an outlet 14 operatively connected to a settler vessel 16, where the cleaned oil (substantially non-ionic hydrocarbon products having a heteroatom content less than the oxidized-heteroatom-containing hydrocarbon feed streams) may be optionally water washed and/or centrifuged 18 to produce a substantially heteroatom-free hydrocarbon product 20. The settled caustic and selectivity promoter can be removed by gravity settling from the bottom of settler vessel 16 to a flue gas desulfurization/caustic recovery unit 22. The recovered caustic and selectivity promoter are then sent back to the mixer vessel 10 to allow for a continuous decontamination reaction process. The settler vessel 16 may comprise a feed inlet 24 from the mixer 10, a clean oil outlet 26 to an optional water wash/centrifuge 18 and then to a clean oil recovery location (not shown) and a caustic/selectivity promoter outlet which may be operatively connected to a flue gas desulfurization caustic recovery unit 22. The flue gas desulfurization caustic recovery unit 22 may comprise a recovered caustic/selectivity promoter outlet 28 which is operatively connected to the mixer 10 for transporting recovered caustic/selectivity promoter from the flue gas desulfurization caustic recovery unit 22 to the mixer 10, providing the continuous process mentioned above. The flue gas desulfurization caustic recovery unit 22 may also comprise a gypsum outlet 30 for transporting gypsum to a gypsum storage or distribution unit (not shown).

In a second representative method and system a oxidized-heteroatom-containing hydrocarbon feed stream may be provided through the line B to a continuous countercurrent reaction column (CCR column) 40, at the top of such column, a recovered caustic and selectivity promoter stream are fed thereto the two streams contact each other in a countercurrent fashion and the selectivity promoter, caustic and sulfite exit through an outlet 42 in the bottom of the column 40 and are transported to a flue gas desulfurization caustic recovery unit 22, where the caustic and the selectivity promoter are regenerated and recovered. The cleaned oil 44 exits from the top of the countercurrent recovery column where it may be optionally washed with water and centrifuged to produce a substantially heteroatom-free hydrocarbon product.

In both the systems and methods, route A, where employing a mixer/settler and route B employing a countercurrent reaction column, generate a used caustic/selectivity promoter stream that exits to the flue gas desulfurization caustic recovery unit 22 to produce a regenerated caustic and selectivity promoter stream that is recycled to the initial stage of the systems and methods and a gypsum by-product containing the heteroatoms previously residing in the untreated feed stream.

EXAMPLES

In order to demonstrate the significant benefit of the present disclosure, examples of the systems and methods of the present disclosure were performed. For comparative purposes, several control reactions were performed. The reaction vessel consisted of a stainless steel Parr type reactor vessel. The reactor was charged with an oxidized-heteroatom-rich hydrocarbon feed and heated to a temperature of 275 C at constant feed rate. The products were analyzed for heteroatom content.

Example 1

A stainless steel (type 316) Parr-type pressure reactor with a volume of 1000 mL was charged with 29 grams of a 1:1 by moles mixture of sodium hydroxide and potassium hydroxide, 11 grams of dibenzothiophene sulfone, and 202 grams of 1,2,3,4-tetrahydronaphthalene. The vessel was heated under rapid stirring to 300° C. The reactor was held at this temperature for 60 minutes, during which the pressure rose to a maximum of 150 psi, then removed from heat and allowed to cool without stirring. 200 grams of liquid were decanted from the reactor, and 41 grams of solids remained. The tetralin layer was analyzed by HPLC. The solids were acidified by adding 125 mL of 5.0M HCl. Vigorous bubbling of released sulfur dioxide from the neutralization of sulfites occurred, confirmed by a sulfur dioxide detector. Dichloromethane was added to extract organics, which was then evaporated, leaving a light brown oil, which was analyzed by HPLC. It was found that >99% of the dibenzothiophene sulfone was converted, to the following products: ortho-phenylphenol (56%), biphenyl (21%), dibenzofuran (4%), and dibenzothiophene (4%), for a total sulfur-free yield of 81%. The yield of all organics was 95%.

Examples 2-4

The experiment of EXAMPLE 1 was repeated three times, except that the temperature was 275° C. The average results were: 94.5% conversion of dibenzothiophene sulfone, to the following products: ortho-phenylphenol (58%), biphenyl (9%), and dibenzofuran (5%). No dibenzothiophene was detected (<1%). The total sulfur-free yield was 73%. The average yield of all organics was 97%.

Example 5

The experiment of EXAMPLE 2 was repeated except that 20 grams of methanol was added to the reactor with the other reactants. The pressure rose to 350 psi during the reaction. It was found that 92% of the dibenzothiophene sulfone had been converted to the following products: 2-methoxybiphenyl (40%), ortho-phenylphenol (30%), biphenyl (6%), and dibenzofuran (3%). No dibenzothiophene was detected (<1%). The total sulfur-free yield was 79%, with 49% being non-ionizable products. In addition, sulfur dioxide was detected after the run when the pressure was vented, before any acid had been added. The yield of all organics was 97%, not including methanol, which was washed away in the acid workup.

Example 6

The experiment of EXAMPLE 2 was repeated except that 45 grams of tert-butanol was added. The results were similar to those of EXAMPLE 2, and the expected tert-butyl ether was not detected. Sulfur dioxide was detected just after the run cooled. The yield of all organics was 92%.

Example 7

The experiment of EXAMPLE 5 was repeated except that 33 grams of sodium methoxide was added to the reactor with the other reactants. The results were similar to those of EXAMPLE 5.

Example 8

The experiment of EXAMPLE 5 was repeated except that the 29 grams of 1:1 molar sodium hydroxide/potassium hydroxide mixture were omitted, and 33 grams of sodium methoxide (which contains some sodium hydroxide as impurity) was added. The results were analyzed by GC-MS, which showed that conversion of dibenzothiophene sulfone was only ~80%, and that the major product formed was ortho-phenylphenol, followed by 2-methoxybiphenyl and biphenyl. Sulfur dioxide was detected immediately after the run cooled. The yield of all organics was 90%.

Example 9

The experiment of EXAMPLE 5 was repeated except that the reaction was held at temperature for 90 minutes. The results were similar to those of EXAMPLE 5. The yield of all organics was 95%.

Example 10

The experiment of EXAMPLE 5 was repeated except that 60 grams of methanol was used. The pressure rose to 750 psi during the reaction. It was found that 94% of the dibenzothiophene sulfone had been converted, to the following products: ortho-phenylphenol (54%), dibenzofuran (10%), 2-methoxybiphenyl (9%), and biphenyl (8%). No dibenzothiophene was detected (<1%). Total sulfur-free yield was 81%. Sulfur dioxide was detected just after the run cooled. The yield of all organics was 100%, not counting methanol.

Example 11

The experiment of EXAMPLE 5 was repeated except that 87 grams of the 1:1 by moles mixture of sodium hydroxide and potassium hydroxide was used. It was found that 97% of the dibenzothiophene sulfone was converted. The product distribution was similar to that of Example 5. The yield of all organics was 91%.

Example 12

The experiment of EXAMPLE 2 was repeated except that 48 grams of phenol were added to the reactor along with the other reactants. The pressure reached 200 psi during the run. No sulfur dioxide was detected after the run, nor was any detected when the solids were acidified with HCl. The products were analyzed by GC-MS, which did not detect any dibenzothiophene sulfone. The major products were ortho-phenylphenol and dibenzothiophene. The yield of all organics was 96%.

Example 13

The experiment of EXAMPLE 1 was repeated except that the reactor was held at temperature for 120 minutes. The results were similar to EXAMPLE 1. The oil layer was decanted from the reactor, and 200 grams of methanol was added to the solids. These were sealed and stirred together at 60° C. for 5 hours. A sample of this product was extracted with dichloromethane and water, and the dichloromethane layer was analyzed by GC-MS. Only a trace of 2-methoxybiphenyl was detected.

Example 14

The experiment of EXAMPLE 2 was repeated except that 40 grams of dicyclopentadiene was added to the reactor with the other reagents. The sample was analyzed by GC-MS, which showed a large number of different products, including a substantial amount of dibenzothiophene.

Example 15

The 1 L pressure reactor was charged with 200 grams of ethanol, 2.4 grams magnesium turnings, and 11 grams dibenzothiophene sulfone. The mixture was stirred at room temperature for 60 minutes. The product was analyzed as-is by GC-MS. Approximately 25% of the dibenzothiophene sulfone had been converted, and the only product was dibenzothiophene.

Example 16

The experiment of EXAMPLE 5 was repeated except that only 10 grams of methanol was added to the reactor with the other reagents. The product was worked up similar to EXAMPLE 1. It was found that 97% of the dibenzothiophene had been converted, to the following products: ortho-phenylphenol (15%), dibenzofuran (2%), 2-methoxybiphenyl (47%), and biphenyl (8%), dibenzothiophene (2%). Total sulfur-free yield was 72%. Sulfur dioxide was detected just after the run cooled. The yield of all organics was 97%, not counting methanol.

Example 17

A 1 L Parr pressure reactor was charged with 200 grams of tetralin, 12 grams sodium hydroxide, 17 grams potassium hydroxide, 11 grams dibenzothiophene sulfone, and 28 grams ethylene glycol. The reactor was purged with nitrogen prior to the run, until no oxygen could be detected on an oxygen sensor (<0.1%). The reactor was sealed and heated to 275° C. for one hour. The product was worked up by the procedure in EXAMPLE 1. However, no sulfur dioxide was detected after the run, or during the acidification. Also, very few bubbles formed during the acidification step. It was found that 100% of the dibenzothiophene sulfone had been converted, to the following products: biphenyl (>75%), ortho-phenylphenol (<25%). The total sulfur-free yield was 100%. The yield of all organics was 97%, not counting ethylene glycol, which was washed away in the acid workup.

Example 18

The experiment of EXAMPLE 17 was repeated except that in place of tetralin and dibenzothiophene sulfone, 100 grams of an oxidized-heteroatom-containing diesel stream with ~2000 ppm sulfur in the form of sulfones was used. In addition, 1.5 grams sodium hydroxide, 2.2 grams potassium hydroxide, and 3.2 grams ethylene glycol were added. The oil product was washed with water and dried, then analyzed for sulfur content by XRF. The process was repeated a total of three times. The sulfur content of the fuel was significantly reduced, to less than 430 ppm S. The nitrogen content was decreased by at least 85%, and the total acid number was decreased below measurable concentrations, at least a 60% decrease.

Example 19

The experiment of EXAMPLE 18 was repeated except that a bitumen stream containing ~4% sulfur was used in place of a diesel. The sulfur content after the reaction was significantly reduced, to less than 1.75% wt sulfur.

Example 20

A stainless steel 1 L Parr-type reactor was charged with 100 grams of an oxidized-heteroatom-containing 2.75% wt sulfur bitumen oil, 21 grams sodium hydroxide, 29 grams potassium hydroxide, and 64 grams ethylene glycol. The reactor was purged with nitrogen, then heated to 275 degrees C. and held at that temperature for 1 hour, then cooled. The oil was washed with water to remove caustic and ethylene glycol until the pH of the water wash was below 8.5, then dried. The sulfur content after the reaction was at most 1% sulfur, vanadium content had been reduced from 175 ppm to less than 65 ppm, and nickel content had been reduced from 67 ppm to below 33 ppm.

Prophetic Example 1

A stainless steel (type 316) Parr-type pressure reactor with a volume of 1000 mL is charged with about 11 grams of dibenzothiophene sulfone, about 202 grams of 1,2,3,4-tetrahydronaphthalene, about 24 g of benzyl alcohol and about 5.7 g of potassium hydroxide. The vessel is heated under rapid stirring to 195° C. The reactor is held at this temperature for about 60 minutes, and then it is removed from the heat and allowed to cool without stiffing. About 210 grams of liquid are decanted from the reactor, and about 8 grams of solids remain. The tetralin layer is analyzed by HPLC. The solids are acidified by adding about 25 mL of about 5.0M HCl. Sulfur dioxide is released as the neutralization of sulfites occurs. Dichloromethane is added to extract organics, which are then evaporated, leaving an oil, which is analyzed by HPLC. The conversion of dibenzothiophene sulfone is at least as good as that presented in EXAMPLE 5 with a similar product distribution: 2-benzyloxy-biphenyl (about 40%), ortho-phenylphenol (about 30%), biphenyl (about 6%), and dibenzofuran (about 3%).

Prophetic Example 2

A stainless steel (type 316) Parr-type pressure reactor with a volume of 1000 mL is charged with about 200 grams of bitumen oil having a sulfur content of 2% wt, 15 grams sodium hydroxide, 21 grams potassium hydroxide, and 35 grams ethylene glycol. The vessel is heated under rapid stirring to 275° C. The reactor is held at this temperature for about 60 minutes, and then it is removed from the heat and allowed to cool without stiffing. About 200 grams of liquid are decanted from the reactor, and about 70 grams of solids remain. The removal of sulfur and metals is at least as good as that presented in EXAMPLE 18 and EXAMPLE 20. Sulfur content is decreased to less than 1% wt, nitrogen and metals content is decreased by more than 50%. The API gravity of the feed is increased by at least 5 units.

The results of the above examples are illustrated in the following table 1.

| EXAMPLE # | % Conversion | 2-methoxybiphenyl | ortho-phenylphenol | biphenyl | dibenzofuran | dibenzothiophene |
|---|---|---|---|---|---|---|
| 1 | 99% | 0% | 56% | 21% | 4% | 4% |
| 2 | 95% | 0% | 58% | 9% | 5% | 0% |
| 3 | 95% | 0% | 58% | 9% | 5% | 0% |
| 4 | 95% | 0% | 58% | 9% | 5% | 0% |
| 5 | 92% | 40% | 30% | 6% | 3% | 0% |
| 6 | 95% | 0% | 58% | 9% | 5% | 0% |
| 7 | 92% | 40% | 30% | 6% | 3% | 0% |
| 8 | ~80% | | major | | | |
| 9 | 92% | 40% | 30% | 6% | 3% | 0% |
| 10 | 94% | 9% | 54% | 8% | 10% | 0% |
| 11 | 92% | 40% | 30% | 6% | 3% | 0% |
| 12 | N/A | | | | | major |
| 13 | 99% | 0% | 56% | 21% | 4% | 4% |
| 14 | N/A | | | | | major |
| 15 | N/A | | | | | major |

-continued

| EXAMPLE # | % Conversion | 2-methoxybiphenyl | orthophenylphenol | biphenyl | dibenzofuran | dibenzothiophene |
|---|---|---|---|---|---|---|
| 16 | 97% | 47% | 15% | 8% | 2% | 2% |
| 17 | 100% | 0% | 25% | 75% | 0% | 0% |

While only certain embodiments have been set forth, alternatives and modifications will be apparent from the above description to those skilled in the art such as the application of the disclosed techniques and apparatus to crude oil, bitumen, kerosene and other fuel streams and the use of similar reagents for converting oxidized-heteroatom-containing hydrocarbons s to non-ionic hydrocarbon products. These and other alternatives are considered equivalents and within the spirit and scope of this disclosure and the appended claims.

What is claimed is:

1. A reaction method for reducing the heteroatom content, reducing total acid number, and increasing API gravity of oxidized-heteroatom-containing hydrocarbon feed streams comprising:
   providing oxidized-heteroatom-containing hydrocarbon feed streams through a feed inlet region;
   providing a contact region, the contact region having at least one caustic and a selectivity promoter operatively positioned therein;
   contacting the oxidized-heteroatom-containing hydrocarbon feed streams in the contact region thereby producing substantially non-ionic hydrocarbon products having a heteroatom content less than the oxidized-heteroatom-containing hydrocarbon feed streams that entered through the inlet region; and
   removing the substantially non-ionic hydrocarbon products having a heteroatom content less than the oxidized-heteroatom-containing hydrocarbon feed streams that entered through the inlet region from the contact region to an outlet region;
   wherein the caustic component of the contact region comprises:
      inorganic compounds that exhibit basic properties;
      inorganic oxides from group IA and IIA elements; and
      mixtures of oxides and hydroxides of group IA and IIA elements;
   wherein the selectivity promoter comprises:
      an organic alcohol, ROH, wherein R is a $C_1$-$C_{18}$ alkyl-, aryl-, or alkenyl-group, that produces a substantially non-ionized hydrocarbon product.

2. The method of claim 1 wherein the inlet region receives the oxidized-heteroatom-containing hydrocarbon feed streams independently or as a mixture comprising oxidized-heteroatom-containing hydrocarbon feed streams and the selectivity promoter, wherein the oxidized-heteroatom-containing hydrocarbon feed streams combine with the selectivity promoter to contact the at least one caustic compound wherein the oxidized-heteroatom-containing hydrocarbons of the feed streams react with the at least one caustic compound and the selectivity promoter such that the substantially non-ionic hydrocarbon products having a heteroatom content less than the oxidized-heteroatom-containing hydrocarbon feed streams that entered through the inlet region are produced thereby.

3. The method of claim 1 wherein the mixture of caustic compounds is supported on an inert metal oxide.

4. The method of claim 1 wherein the mixture of caustic compounds is at least one of a molten liquid and a molten mixture.

5. The method of claim 1 wherein the caustic component of the reaction region comprises:
   molten hydroxides of group IA and IIA elements.

6. The method of claim 1 wherein the caustic component of the reaction region comprises:
   $Li_2O$, $Na_2O$, $K_2O$, $Rb_2O$, $Cs_2O$, $Fr_2O$, BeO MgO, CaO, SrO, BaO, and the like and their mixtures or molten mixtures thereof.

7. The method of claim 1 wherein the caustic component of the reaction region comprises:
   LiOH, NaOH, KOH, RbOH, CsOH, FrOH, $Be(OH)_2$, $Mg(OH)_2$, $Ca(OH)_2$, $Sr(OH)_2$, $Ba(OH)_2$, and or mixtures thereof.

8. The method of claim 1 further comprising:
   a support component;
   wherein the support component is at least one of an inert or active inorganic oxide and a porous support selected from the group comprising talc or inorganic oxides.

9. The method of claim 8 wherein the inorganic oxides are oxides of elements of groups 2, 3, 4, 5, 13, 14, 15 and 16 of the Periodic Table of the Elements.

10. The method of claim 9 wherein the inorganic oxides are selected from the group comprising:
    silicon dioxide, aluminum oxide and also mixed oxides of the two elements and corresponding oxide mixtures.

11. The method of claim 9 wherein the inorganic oxides are selected from the group comprising:
    MgO, $ZrO_2$, $TiO_2$ or CaO, and or mixtures thereof.

12. The method of claim 1 wherein the support component has a specific surface area in the range from 10 to 1000 $m^2$/g, a pore volume in the range from 0.1 to 5 ml/g and a mean particle size in the range from 0.1 to 10 cm.

13. The method of claim 1 wherein the product is substantially insoluble in the caustic and is capable of exiting the outlet region with the hydrocarbon phase.

14. A reaction method for reducing the heteroatom content, reducing total acid number, and increasing API gravity of oxidized-heteroatom-containing hydrocarbon feed streams comprising:
    providing oxidized-heteroatom-containing hydrocarbon feed streams through a feed inlet region;
    providing a contact region, the contact region having a molten mixture of sodium hydroxide, potassium hydroxide and a selectivity promoter operatively positioned therein;
    contacting the oxidized-heteroatom-containing hydrocarbon feed streams in the contact region thereby producing substantially non-ionic hydrocarbon products having a heteroatom content less than the oxidized-heteroatom-containing hydrocarbon feed streams that entered through the inlet region; and reducing total acid number, and increasing API gravity; and
    removing the substantially non-ionic hydrocarbon products through an outlet region;
    wherein the selectivity promoter comprises:
      an organic alcohol, ROH, wherein R is a $C_1$-$C_{18}$ alkyl-, aryl-, or alkenyl-group, that produces a substantially non-ionized hydrocarbon product.

* * * * *